April 22, 1969 L. C. VERCELLOTTI ET AL 3,440,629
COMPUTER INTERRUPT CIRCUIT
Filed March 1, 1966

WITNESSES:
Bernard R. Gieguez
Robert C. Baird

INVENTORS
Leonard C. Vercellotti &
Richard A. Johnson.
BY E. F. Possessky
ATTORNEY United States Patent Office 3,440,629
Patented Apr. 22, 1969

3,440,629

COMPUTER INTERRUPT CIRCUIT

Leonard C. Vercellotti, Penn Hills Township, Verona, and Richard A. Johnson, Monroeville, Pa., assignors to Westinghouse Electric Corporation, Pittsburgh, Pa., a corporation of Pennsylvania Filed Mar. 1, 1966, Ser. No. 530,924
Int. Cl. G11b 5/44
U.S. Cl. 340—174 7 Claims The present invention relates to computer input and output circuitry and more particularly to computer interrupt circuits.

Efficient computer operation is promoted by the use of interrupt circuitry which allows the computer to carry out instructions and programs as operations are being completed by relatively slowly functioning input and output equipment and which further causes the computer to respond rapidly to such equipment when a new input is ready for computer entry or a new computer output can be accepted. Thus, an interrupt subsystem provides for coordination in the functioning of the computer with that of equipment such as typewriters, card or tape readers, tape punches, analog input systems, contact closure output systems or process plant input contact systems.

As an illustration, an input interrupt circuit can signal the computer when an input is ready for entry and the computer regulates its own operation for acceptance of the input. A direct call up is then made for a program in the computer memory. In relatively small capacity computers, the computer main frame itself is directed from its running program to scan an interrupt input register and determine which input has caused the interrupt. In larger machines, the identification function is normally performed by an auxiliary scanner but the same end result is reached, i.e., the new input calls up a new program from the computer memory. After responding to all current input interrupts, the computer continues its execution of programs until the next interrupt occurs.

An input interrupt subsystem can be illustrated in greater detail by consideration of a process computer system in which a large number of variables may be instrumented or monitored to generate a corresponding number of different buffer inputs in the form of data words or logic signals. An interrupt circuit may be associated with each logic element or contact input and each data word register input, and after the computer identifies the source of an interrupt circuit signal the corresponding buffer input is coupled to the computer. If two or more available buffer inputs coexist and the computer can accept only one input at any one time, the interrogation sequence establishes the order in which inputting occurs. Fast computer operation results in an acceptably small percentage of the total computer use time being devoted to slow peripheral operations.

One common interrupt circuit arrangement includes the use of a square loop magnetic core which serves to store an interrupt command as well as to isolate electrically the interrupt input circuits from the computer ground. Although the interrupt input provides the energy to set the core, a synchronizing pulse called a probe pulse is generated by the computer to prevent interference between the input signal which sets the core and a computer generated signal which interrogates the core. Thus, in the process computer example, the computer may generate a probe pulse train which is applied to all of the interrupt circuits to result in setting the interrupt core of any particular interrupt circuit if the buffer input associated therewith is in an inputting state during the application of a probe pulse. Commonly, a threshold switch device allows a core set pulse to flow in a core set winding if the probe pulse and an interrupt input drive voltage of adequate amplitude occur simultaneously and produce the threshold voltage level across the threshold device.

The response voltage which occurs when a core is set is utilized to signal the computer that a "hit" has occurred. The computer then begins the interrogation sequence or interrupt scan during which the various interrupt cores are successively pulsed to identify and reset the hit cores and thereby identify the location of its next instruction.

To function properly, the interrupt circuitry desirably operates with high noise immunity and desirably produces a single core set pulse for a single interrupt input drive signal of varible duration. Successive core set pulses which duplicate a single interrupt drive command result in faulty information and computer time wastage, and failure to produce a core set pulse in response to an interrupt drive command results in omitted or deferred computer operations.

It is also often desirable that the computer maintain a fast interruption rate and a correspondingly fast core reset rate so that the working data for the computer programs are kept highly current. In some computer designs, a fast probe pulse rate may be used primarily for reasons other than information currency. Thus, fast pulse circuitry used in the computer for some other purpose, such as memory scan, can serve the additional purpose of interrupt core probing without the requirement of any additional electronic circuitry to establish a slower pulse rate.

One difficulty with interrupt circuit arrangements has been the development of inadequate current pulses for core setting in response to interrupt drive commands. Another difficulty has been the development of multiple successive core setting current pulses when only a single core set pulse should be generated. The difficulties have been observed to become more pronounced at higher interruption rates because commercially available threshold switch devices characteristically are sensitive to the rate of rise of the probe voltage pulses as well as probe voltage pulse amplitude per se. Tight specifications on the threshold switch device provide only a limited and expensive solution to the problem.

In accordance with the broad principles of the present invention, novel circuitry is preferably arranged in separate component form to provide both economy and reliability in computer interrupt operation. A memory device is coupled to the output of the interrupt circuit and it is operated by a circuit loop which includes a threshold switch device. The threshold circuit loop further is connected to an input drive circuit and includes an element which couples a computer probe pulse voltage waveform in series with the input drive voltage.

A controlled switch, preferably a transistor, is connected in the loop and is responsive to the input drive voltage substantially to isolate the probe pulses from the threshold switch device until the drive voltage reaches a predetermined level. When the controlled switch is operated, the circuit voltage is applied across the threshold switch to cause breakover and current flow in the threshold circuit loop thereby setting the memory device. Means such as a capacitor are preferably connected in the threshold circuit loop to build blocking voltage against circuit refiring and multiple successive memory settings by the same input drive voltage.

It is, therefore, an object of the invention to provide a novel computer interrupt circuit which is both economic in manufacture and reliable in operation.

Another object of the invention is to provide a novel and economic computer interrupt circuit which operates reliably at relatively high computer interruption rates.

A further object of the invention is to provide a novel computer interrupt circuit which employs an output magnetic core operated by a threshold switch circuit and which avoids inadequate or multiple core setting pulses otherwise caused by computer probe pulse rate of rise effects.

These and other objects of the invention will become more apparent upon consideration of the following detailed description along with the attached drawing, in which.

Figure 1:
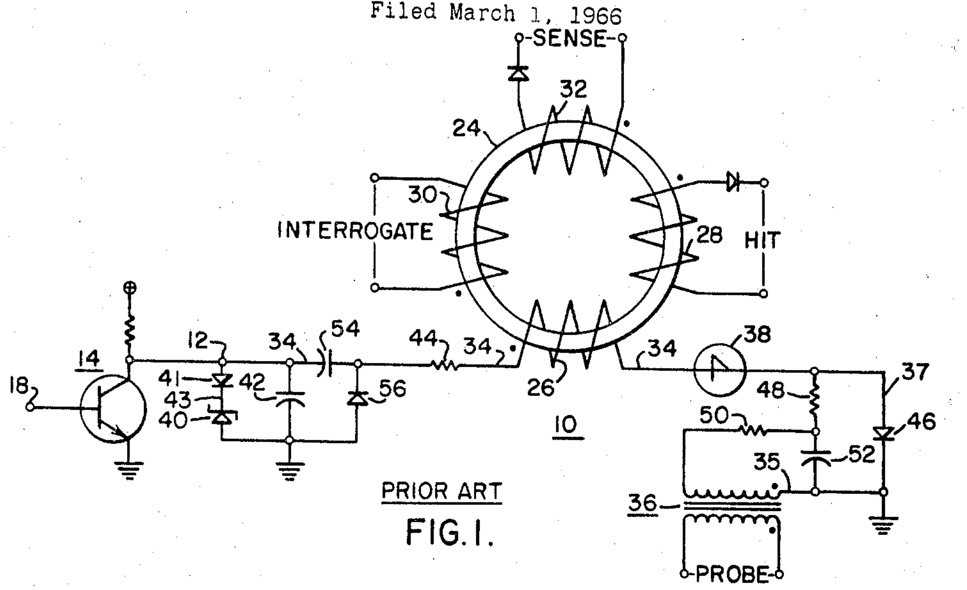
FIGURE 1 shows a schematic diagram of a typical prior art computer interrupt circuit.
Figure 1A:
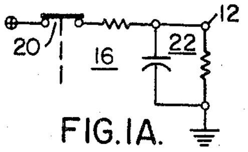
FIG. 1A shows a modified input circuit for the circuit of FIG. 1.

More specifically, there is shown in FIG. 1 a typical prior art computer interrupt circuit 10 for which an input interrupt drive voltage is provided at junction 12 by a suitable input circuit such as a transistor switch circuit 14 or a relay contact circuit 16 (FIG. 1A). The circuit 14 or 16 is actuated when, for example, a computer input buffer device (not shown) with which it is associated has a data word or a signal ready for computer entry.

In particular, the input drive circuit 14 is actuated when voltage at transistor base terminal 18 causes the transistor-collector-emitter path to become non-conductive. In actuation of the drive circuit 16, a relay is operated to close contact 20. Some noise rejection is provided by the interrupt circuitry, and the relay contact circuit 16 includes an RC filter 22 to provide additional noise rejection and to prevent multiple operation of the interrupt circuit 10 as a result of relay contact closure bounce. When the circuit 14 or 16 is actuated, the potential at the junction 12 rises toward a predetermined level which in effect is a command for a computer interrupt.

At the output of the prior art computer interrupt circuit 10, a memory element in the form of a square loop magnetic core 24 is provided for temporarily storing the interrupt command until the computer is ready for its acceptance and for isolating the interrupt circuit 10 from the computer ground. On the core 24 there is provided a set winding 26 which forms a part of the computer interrupt circuit 10 and a hit winding 28 which is connected (not indicated) to the computer so as to produce a hit signal when the magnetic core material is driven to its positive saturation state by a set pulse in the set winding 26.

An interrogation winding 30 is also provided on the core 24 for the purpose of applying computer timed interrogation pulses thereto after a hit signal has been generated by the winding 28. An interrogation pulse drives the core material to its negative saturation state if it previously had been in its positive saturation state, and in so doing produces a pulse signal in a sense winding 32 which is coupled to the computer to identify the particular interrupt core 24 determined to have been in a hit state. Thus, for hardware economy, a single memory device such as a flip-flop element (not shown) commonly is coupled to a plurality of interrupt cores 24 to indicate to the computer when a hit has occurred in one of the cores 24, and the computer determines which of the cores have been hit by the interrupt core interrogation or scan. When a particular interrupt core has been identified as having been hit, its associated input buffer device is coupled to the computer for entry of its data word or logic signal. If two or more interrupt cores exist in a set state, the sequence of interrogation establishes which interrupt has the higher priority.

It is desirable that the core 24 be set with substantial drive energy when an interrupt command is to be completed. Thus, the computer interrupt circuit 10 includes a circuit loop 34 which is intended to direct current through the core set winding 26 only after the drive voltage at junction 12 reaches a predetermined level and a computer probe voltage pulse is produced across the secondary of a suitable pulse transformer 36 in branch 35 of the loop 34. Under this loop voltage condition, a threshold switch 38 is switched to conduct the core set current. To prevent simultaneous core set and reset pulses, the computer probe and interrogation pulses are time displaced.

A capacitor 42 connected between the loop 34 and the common junction delays drive voltage rise at the junction 12 but serves as a storage medium to increase the set winding current pulse amplitude when voltage breakover occurs in the switch 38. After switch breakover, current flows in the loop 34 from the junction 12 and the storage capacitor 42 through a current limiting resistor 44, the set winding 26, the switch 38 and a current directing diode 46 in loop branch 37 to the common junction. Resistors 48 and 50 both limit current through the pulse transformer secondary and form with capacitor 52 a filter which limits probe rate of voltage rise.

The core set current flows through the set winding 26 and the switch 38 until low current and low voltage loop conditions cause the switch 38 to reset to its non-conductive state. In order generally to prevent refiring of the threshold switch 38 in response to the magnitude of the same continuing input drive voltage on subsequent computer probe voltage pulses, a capacitor 54 is connected in the circuit loop 34 for charging by current from the junction 12 and discharge current from the capacitor 42 during the breakover conduction time of the switch 38. Thus, when the switch 38 stops conducting, the potential at the junction 12 must rise to a higher lever as determined by the charged voltage of the capacitor 54 before a breakover voltage can be applied to the switch 38. The circuit design is arranged such that a Zener diode 40, connected in a path 43 to ground and protected against back voltage by diode 41, prevents the junction 12 from reaching the higher potential required for switch refiring during the continuance of the original actuated state of the input circuit 14 or 16. In the alternative, the input circuit voltage supply can be controlled to produce an equivalent limiting effect.

When de-actuation occurs in the circuit 14 or 16, the capacitor 54 is discharged to ground through the circuit 14 or 16 and current directing diode 56. Since the capacitor 54 can have a capacitance equal to about 10% or less of the capacitance of the capacitor 42, resetting time of the computer interrupt circuit 10 for acceptance of a new input interrupt drive signal from the input circuit 14 or 16 is adequate for most applications.

The threshold switch 38 can be and usually is a four layer PNPN device. Since this and other similar threshold switches characteristically are sensitive to the rate at which voltage is applied across them, as well as to the voltage magnitude itself, the prior art computer interrupt circuit 10 operates unreliably under certain circumstances. Thus, if the circuit 14 or 16 has just been actuated and voltage begins to rise across the capacitor 42, a probe pulse across the secondary of the transformer 36 can reduce the switch impedance and thereby cause the threshold switch 78 to conduct current as a result of the probe pulse rise rate.

In that event, the voltage across the capacitor 42 may be so low that inadequate current will flow through the set winding 26 to produce magnetic switching of the core 24. In the alternative, a flux change may be produced in the core 24, but the change would be insufficient to produce a hit signal in the hit winding 28 of adequate magnitude for computer command. Successive non-core setting current pulses caused by successive probe pulses can produce ratchet charging of the blocking capacitor 54 until core setting by drive voltage magnitude is prevented altogether by the blocking voltage.

On the other hand, even if drive voltage does produce an acceptable core set pulse, the core 24 may be pulsed and set again on a subsequent computer probe pulse and after interrupt core interrogation. The multiple setting fault can occur even though the original and continuing input drive voltage at the junction 12 would otherwise have inadequate magnitude to overcome the blocking voltage of the capacitor 54 and produce switch conduction.

Figure 2:
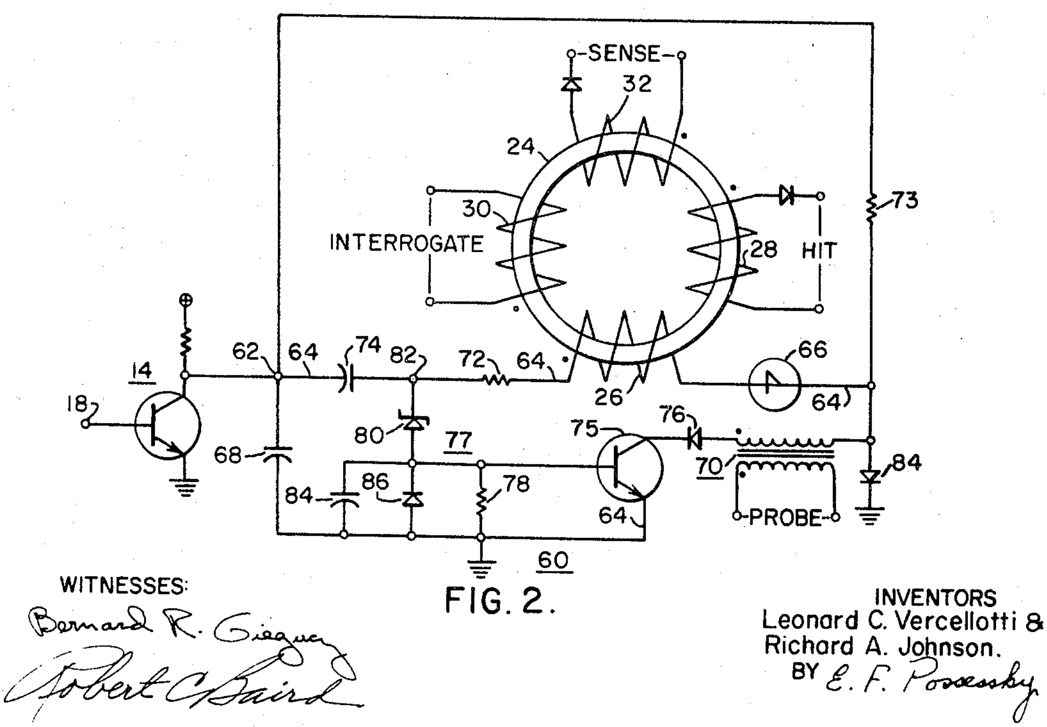
FIG. 2 shows a schematic diagram of a computer interrupt circuit arranged in accordance with the principles of the present invention.

In FIG. 2, a computer interrupt circuit 60 is arranged in accordance with the principles of the present invention for economic and reliable computer interrupt operation. The circuit 60 includes elements preferably arranged as separate components, but integrated circuitry can be employed as desired. An input circuit such as the circuit 14 is coupled to input junction 62 and an output memory element such as the core 24 is connected at the output of the interrupt circuit 60 with the same windings provided as described in connection with FIG. 1.

A threshold circuit loop 64 includes a threshold switch 66 for controlling the flow of interrupt core set current pulses through the set winding 26. The switch 66 preferably is a four-layer solid state device since such devices characteristically carry high amplitude core set pulses on breakover with turn on times as fast as 100 nanoseconds or less.

In many applications, a core set current of one ampere is considered adequate and a four-layer switch can provide such ampere service. Further, four-layer devices have a relatively low triggering energy requirement and exhibit a latching type turn on characteristic to assure adequate amplitude core set current pulses, even if the input drive voltage should reach the predetermined core set level toward the end of a computer probe pulse. By threshold switch, it is meant to refer to a device which has no control terminals, which is conductive or non-conductive according to circuit conditions at or across its circuit connection terminals, and which exhibits an abrupt and large reduction in its forward voltage as its threshold level is exceeded. For additional disclosure on improved computer interrupt circuitry in which other types of switches can be used, reference is made to a copending application entitled, "Computer Interrupt Circuit," filed by A. Brastins and L. Vercellotti on Mar. 1, 1966, Ser. No. 530,923 and assigned to the present assignee.

At the input of the computer interrupt circuit 60, a storage capacitor 68 is connected between the loop 64 and the common junction, and the interrupt drive voltage across the capacitor 68 is additive with the computer probe pulse voltage developed across the secondary of a suitable pulse transformer 70 in the threshold circuit loop 64. The probe pulse generation rate determines the highest rate at which the computer can be interrupted and would typically be one pulse every eighteen microseconds. For reasons previously given, the probe and interrogation pulses supplied to the circuit 60 are time displaced.

When probe and stored drive voltage cause breakover of the threshold switch 66, current flows through the set winding 26 limiting resistor 72, and voltage is developed across a series capacitor 74 until the threshold switch 66 returns to a non-conductive state by developing current and voltage conditions in the threshold circuit loop 64. The resultant blocking voltage on the capacitor 74 then prevents refiring of the threshold switch 66 until the old interrupt drive voltage is replaced by a new interrupt drive voltage at the junction 62. A resistor 73, connected to the input junction 64 and the cathode of the switch 66, is used to provide a discharge path for probe pulse charge stored in circuit capacitance prior to input drive voltage application so that the cathode is held at a reference potential to eliminate spurious switch firings.

The computer probe pulses are substantially isolated from the switch 66 by a controlled switch 75 until the interrupt drive voltage at the junction 62 or across the storage capacitor 68 is at a predetermined level which will result in a substantial core set pulse. Thus, the threshold switch 66 cannot be made conductive by the rate of rise of the computer probe voltage pulses, and extremely fast interruption rates using fast rise probe pulses are readily produced by the circuit 60. Core set pulses in the winding 26 always have adequate magnitude and always occur when the input drive circuit 14 produces a new interrupt drive voltage at the junction 62. Further, after the core setting operation and after threshold switch turn-off, multiple successive core settings are avoided by elimination of switching effects otherwise due to probe pulse rate of rise when an interrupt drive voltage is applied at the junction 62 for a continuing period of time.

To produce the described operation, the controlled switch 75 is connected with a current directing diode 76 in series in the circuit loop 64 between the secondary of the pulse transformer 70 and a common or ground junction. The controlled switch 75 is preferably a solid state device and further preferably is a transistor. The collector-emitter path of the transistor 75 is serially connected in the loop 64 and substantially isolates the computer probe pulse voltage from application across the threshold switch 66 unless the transistor 75 is driven to a conductive state by base-emitter control.

After the input circuit 14 is actuated, the transistor 75 is held in a non-conductive state until it is gated to a conductive state by a control circuit 77 when the voltage across the storage capacitor 68 has a predetermined and sufficient amplitude to produce a satisfactory set current pulse in the core set winding 26. Thus, base-emitter drive voltage is produced across a resistor 78 which is connected through a Zener diode 80 to a junction 82 between the capacitor 74 and the resistor 72 in the circuit loop 64. The resistor 78 drains leakage current from the Zener diode 80, and a capacitor 84 connected in parallel with the resistor 78 provides compensatory capacitance for the inherent capacitance in the Zener diode 80.

The breakover level of the Zener diode 80 is predetermined to provide current flow through the leakage current resistor 78 and the base-emitter junction of transistor 75 when the potential at the junction 82 reflects an interrupt drive voltage level of adequate magnitude at the junction 62. When the Zener diode 80 becomes conductive, the transistor 75 is switched to a conductive state and the threshold switch 66 is caused to breakover at the first coincidence of a computer probe voltage pulse with the predetermined and adequately sized interrupt drive voltage level at the junction 62. The rate of rise of the computer probe voltage pulses thus cannot switch the threshold device 66 unless the interrupt drive voltage level has adequate magnitude to produce a proper core set pulse in the set winding 26.

When threshold switch breakover occurs, a set current pulse flows through the set winding 26, and is directed to the common junction through a diode 84. After set current switch off, the accumulated back voltage across the blocking capacitor 74 prevents the potential at the junction 82 from reaching the characteristic breakover level of the Zener diode 80 and the transistor 75 is thus again held non-conductive substantially to isolate the computer probe voltage pulses from application across the threshold switch 66 .

When the input circuit 14 is operated to remove the interrupt drive voltage from the junction 62, the blocking capacitor 74 discharges in a circuit loop through the input circuit 14 and a diode 86 and the forward biased Zener diode 80 in the transistor control circuit 77. After discharge of the blocking capacitor 74, the computer interrupt circuit 60 is reset for acceptance of a new interrupt drive voltage from the input circuit 14 which will result in core setting and interrogating operations in the manner previously described.

The computer interrupt circuit 60 operates with improved reliability and at relatively higher computer interrupt rates. Although the circuit 60 includes more circuit elements than the prior art circuits such as the circuit 10, overall economy is achieved because tight threshold switch specifications are required in prior art arrangements. However, even with tight threshold switch specifications, prior art circuitry is susceptible to unreliable breakover operation whereas the circuit 60 provides highly reliable operation substantially independently of variations in threshold switch parameters characteristically found in commercially available threshold switch devices.

What is claimed is:

1. A computer interrupt circuit coupled to a magnetic core output and actuable by an interrupt drive voltage at an input junction, said circuit comprising a threshold circuit branch connected between the input junction and a common junction, said circuit branch including a threshold switch and a core winding connected in series with an element across which probe voltage pulses are developed, and means for substantially isolating the probe voltage pulses from said threshold switch until the voltage level at the input junction is at a predetermined value.

2. A computer interrupt circuit as set forth in claim 1 wherein the last-mentioned means includes a controlled switch connected in series in said circuit branch, and means responsive to a predetermined potential point in said circuit branch for controlling the state of said controlled switch.

3. A computer interrupt circuit as set forth in claim 1, wherein said circuit branch further includes a capacitor connected between said threshold switch and the input junction.

4. A computer interrupt circuit as set forth in claim 3, wherein a storage capacitor is connected between the input and common junctions.

5. A computer interrupt circuit as set forth in claim 4, wherein the last-mentioned means includes a controlled switch connected in series in said circuit branch, and means responsive to the potential at a point in the path between the first mentioned capacitor and said threshold switch for controlling the state of said controlled switch.

6. A computer interrupt circuit as set forth in claim 5, wherein said responsive means includes a control circuit connected between the last mentioned path point and the common junction, said control circuit including a voltage level detecting device, and a portion of said control circuit connected through the control terminals of said controlled switch to provide drive current therefor.

7. A computer interrupt circuit as set forth in claim 6 wherein means are included in said control circuit for completing a discharge path for the first-mentioned capacitor after threshold switch breakover and reset and after removal of the interrupt drive voltage from the input junction.

References Cited

UNITED STATES PATENTS

| | | | |
|---|---|---|---|
| 2,954,482 | 9/1960 | Alizon | 307—88 |
| 3,079,697 | 1/1963 | Dinger | 307—282 X |
| 3,204,123 | 8/1965 | Mahoney et al. | 307—282 X |
| 3,191,060 | 6/1965 | Mahoney | 307—282 X |
| 3,209,174 | 9/1965 | Cole | 307—282 X |
| 3,244,904 | 4/1966 | Schwartz | 307—282 X |
| 3,265,955 | 8/1966 | Brown | 307—314 X |
| 3,332,074 | 7/1967 | Arnold | 340—174 |

STANLEY M. URYNOWICZ, *Primary Examiner.*

U.S. Cl. X.R.

307—88, 282, 314